Feb. 15, 1966   D. C. TRIMBLE   3,235,636
METHOD OF MOLDING TEFLON
Filed Aug. 27, 1963
2 Sheets-Sheet 1
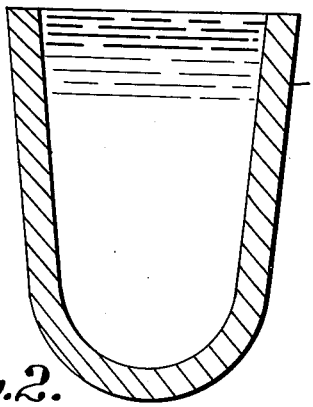
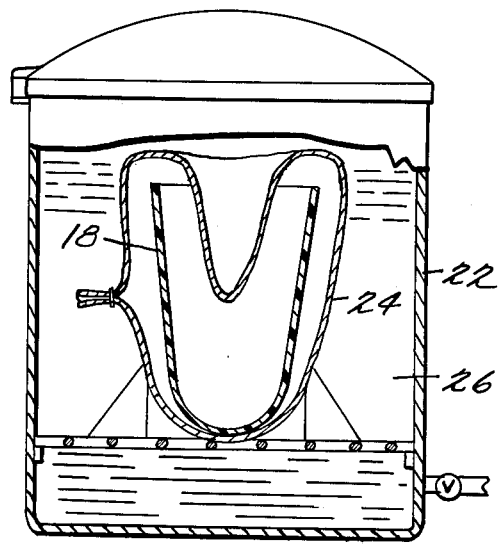
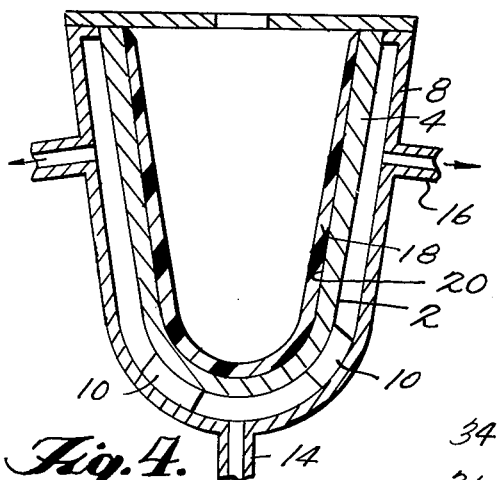
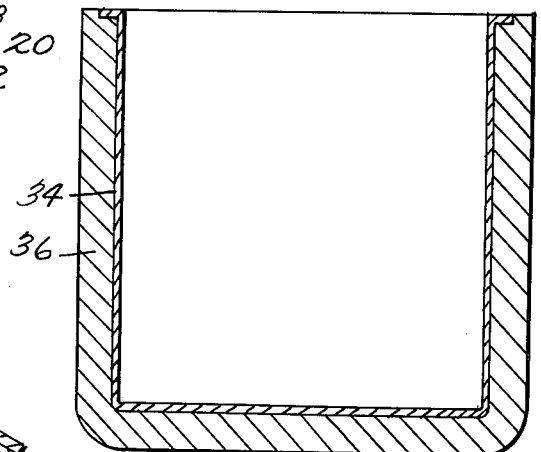
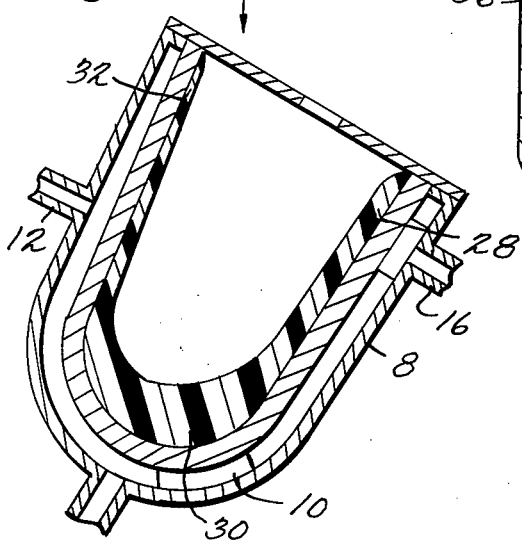
INVENTOR
DAVID C. TRIMBLE
BY Cushman, Darby & Cushman
ATTORNEYS

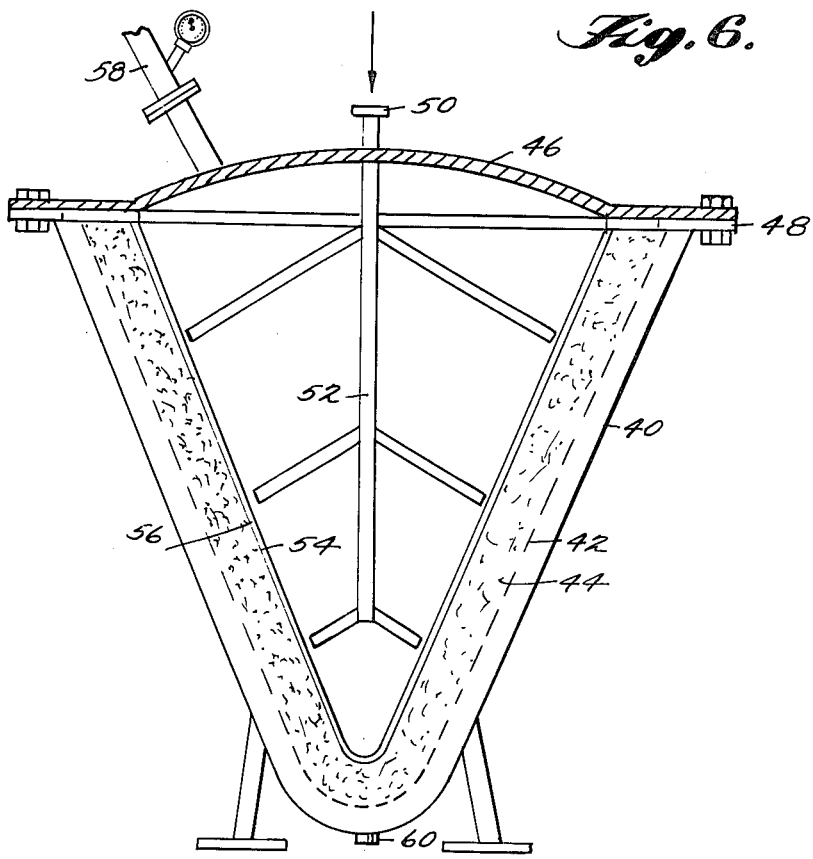
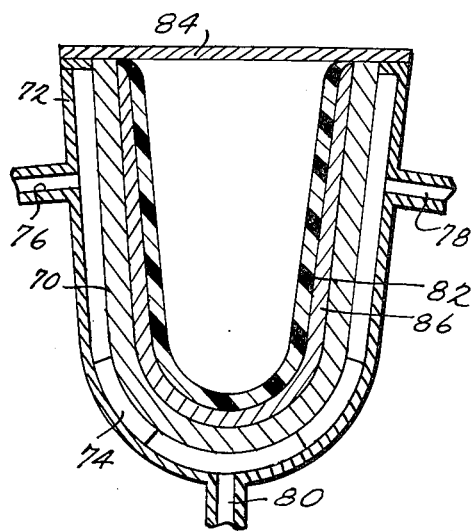

United States Patent Office 3,235,636
Patented Feb. 15, 1966

3,235,636
METHOD OF MOLDING TEFLON
David C. Trimble, Yorklyn, Del., assignor, by mesne assignments, to Haveg Industries, Inc., a wholly-owned subsidiary of Hercules Powder Company, New Castle, Del., a corporation of Delaware
Filed Aug. 27, 1963, Ser. No. 305,007
3 Claims. (Cl. 264—87)

This application is a continuation-in-part of application Ser. No. 272,469, filed Apr. 11, 1963.

The present invention relates to the preparation of molded polymers of halohydrocarbons such as Teflon (polytetrafluoroethylene).

Teflon is normally molded, e.g., as a covering for magnet wire, by coating out of an aqueous dispersion. When it coated out too thick, mud cracking occurs. Consequently, it is necessary to use multiple passes and sinter in between the passes. Even with multiple passes, the upper limit is 20 to 30 mils (with 0.5 to 1.5 mils being applied per pass).

Teflon has a sensitive surface. The surface of the particles cannot be wiped without its losing its ability to stick to itself.

It has been proposed in Alfthan Patent No. 2,440,190 to form a slurry of finely divided polytetrafluoroethylene in a volatile liquid dispersant inert to and capable of wetting the polytetrafluoroethylene, sedimenting a layer of the polytetrafluoroethylene from the slurry, e.g., on a muslin filter, removing the excess liquid dispersant, pressing the polytetrafluoroethylene layer at a pressure of at least 50 p.s.i., releasing the pressure, seasoning the polymer and sintering the polytetrafluoroethylene at a temperature above 327° C. By this procedure, flat sheets are produced having a maximum thickness prior to compressing (and sintering) of up to 26 mils (Example IV) and after compressing (and sintering) 24 mils (Example III). To obtain greater thickness, it was necessary to weld a plurality of sheets together (Example III). This procedure has the disadvantage that in order to make shapes other than flat sheets, further working is required, Hochberg Patent No. 2,997,448.

Other molding procedures for polytetrafluoroethylene are disclosed, for example, in Cresap Patent No. 2,929,109 and Squires et al. Patent No. 2,710,991.

It is an object of the present invention to develop a novel method for obtaining molded products from halogenated hydrocarbon polymers containing fluorine as the predominating halogen.

Another object is to develop a method for making products having thick sections of polytetrafluoroethylene.

A further object is to make polytetrafluoroethylene objects which can be non-uniform in thickness and which can be of any desired configuration.

An additional object is to devise an improved slurry technique for molding polytetrafluoroethylene and other halogenated hydrocarbon polymers containing fluorine as the predominating halogen.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by vacuum molding polytetrafluoroethylene from a slurry of the same utilizing a mold of the desired configuration. The molded product is then sintered at a temperature of above 327° C., e.g., 350° C., 380° C. or 400° C. Usually, the sintering temperature does not exceed 500° C.

In place of vacuum molding the polytetrafluoroethylene from the slurry alternatively there can be imparted a pressure to the slurry in order to mold the polymer and then sintering is carried out as set forth.

It has been found possible, according to the invention, to build up sections of polytetrafluoroethylene as thick as 100 mils, 1 inch (1000 mils), or more, using the invention without getting mud cracking or other undesirable properties nor is there a need to resort to multiple dips with sintering after each dip. Special areas can have a build up of extra amounts of polytetrafluoroethylene either by controlling the level of the slurry, e.g., tilting the mold with the mixture in it or by applying a greater vacuum to the special areas than in other areas or otherwise exposing some areas to a greater concentration of polymer than other areas.

The molded product is not fully cohered prior to sintering and is porous in nature. Consequently, it normally shrinks, e.g., to about 75% of its original size in the sintering operation. While polytetrafluoroethylene has a density of 2.2, the products of the present invention, utilizing polytetrafluoroethylene, have an apparent density of 1.5 to 2.0 without pressuring, while, with compacting, it can be configured to shape at its full density of 2.2.

While normally there is employed a slurry of 0.1–15% of polytetrafluoroethylene in kerosene or varnish makers and painters naphtha, there can be employed other liquid dispersants inert to and capable of wetting polytetrafluoroethylene and which boil below 327° C., e.g., hexane, n-heptane, tetrachloroethylene, pinene ethyl alcohol, acetone, isopropyl alcohol, methyl alcohol, diethyl ether, ethyl acetate, dibutyl phthalate, triethanolamine, etc.

The invention will be best understood in connection with the drawings, wherein:

FIGURE 1 is a vertical section of a mold containing a polytetrafluoroethylene slurry;

FIGURE 2 is a vertical section of a mold similar to that of FIGURE 1 after application of a vacuum;

FIGURE 3 is a vertical elevation partially in section and illustrates the use of a hydroclave to apply pressure to a vacuum molded Teflon article;

FIGURE 4 illustrates one method of controlling the thickness of the molded article;

FIGURE 5 illustrates vacuum molding of a beaker;

FIGURE 6 is a vertical section of a mold designed for pressure molding and containing a polytetrafluoroethylene slurry; and FIGURE 7 is a vertical section of a matched metal mold adapted for vacuum molding the polytetrafluoroethylene slurry.

Unless otherwise indicated, all parts and percentages are by weight.

Referring more specifically to FIGURE 1, there is provided a salt mold 2. The mold has micropores 4 dispersed therethrough. Instead of employing a salt mold, there can be employed any other mold having fine interconnecting pores dispersed therethrough, which mold is insoluble in the liquid dispersant for polytetrafluoroethylene and which will withstand the sintering temperature if it is to be used as a supporting member during the sintering operation. Thus, the mold can be made of microporous sand or microporous thermoset synthetic resin, e.g., phenol formaldehyde, melamine-formaldehyde, urea-formaldehyde, alkyd resin, epoxy resin, e.g., bisphenol A-epichlorhydrin resin, porous carborundum, porous glass, porous ceramic material, or porous metal, compacted corundum, compacted granular quartz, resin bonded sand, e.g., phenol-formaldehyde bonded sand.

Into the mold is placed a dispersion 6 of 3% micropulverized polytetrafluoroethylene in kerosene.

The female mold 2 prior to introduction of the polytetrafluoroethylene was placed in a vacuum chamber 8. The mold was supported on rings 10. Vacuum was applied through lines 12, 14 and 16 to remove the liquid, and the polytetrafluoroethylene appeared as a solid layer 18 in the form of a nose cone on the inner wall 20 of the mold 2. The vacuum was one of 100 mm. Hg, although this can be increased to give a pressure as little as 14 mm. Hg or less, e.g., 1 mm. Hg, or increased to give a pressure of 400 mm. Hg or somewhat higher. In molding large pieces, the outside of the mold can be backed up with a perforated plate.

The mold 2 was then removed from the vacuum chamber 8 and the mold containing the nose cone 18 was sintered at 399° C. in an oven (not shown) to reduce the porosity of the product. The heating shrunk the nose cone to 75% of its original size. The final nose cone had a density of 1.74 compared to 2.2 for the polytetrafluoroethylene from which it was derived.

In order to make a more dense article, there can be employed a hydroclave container 22, as shown in FIGURE 3. Thus, the nose cone 18 is removed from the mold 2 and placed in polyethylene bag 24 which is then substantially evacuated. The bag can be made of any convenient material not affected by the liquid in the hydroclave. Thus, it can be made of Mylar (polyethylene terephthalate), irradiated polyethylene (Cryovac-type L film), saran (vinylidene chloride polymer), rubber hydrochloride, polyvinyl chloride or polypropylene. Then, water 26 is pumped into the hydroclave to impart a pressure of 2000 p.s.i. to densify the polytetrafluoroethylene nose cone and reduce its size, e.g., compare FIGURES 2 and 3 wherein the identical piece is used. The thus-densified molded nose cone is then removed from the hydroclave and sintered above 327° C., e.g., at 380° C. to give a final nose cone having a density of substantially 2.2.

In place of water any other liquid inert to the bagging material can be used, e.g., oils such as hydrocarbon oils, in the hydroclave. The pressure in the hydroclave can be from 250 p.s.i. to 5000 p.s.i. or higher. Usually, the hydroclave pressure is between 1000 p.s.i. and 4000 p.s.i.

While it is preferable to densify the polytetrafluoroethylene cake with a hydroclave or autoclave, alternatively pressure can be applied mechanically. There can even be used the Swedlow cable-clave process wherein high strength steel cables are employed rather than a hydroclave as set forth in Plastics Technology for February 1963.

The process of the present invention can be used to mold irregular shapes for which conventional Teflon molding procedures are unsuitable. The process can be carried out by forming the polytetrafluoroethylene product around either a male or female mold.

The amount of shrinking during sintering will depend, to some extent, on how porous the product is. The product can shrink, for example, to a size which is 65 to 95% of the original size. In cases of extreme compaction, essentially no shrinkage, or even a slight growth may be observed.

As previously stated, the present invention can be used to control the thickness in various sections of the product. Thus, as shown in FIGURE 4, by controlling the level of liquid in different areas, e.g., by tilting the vacuum chamber 6 to the right, the article formed has an increased thickness in the area 28 and especially in the region 30 as compared with the region 32. Similar results can be obtained if, instead of tilting the mold during the vacuum treatment, there is applied a varying degree of vacuum in the different areas, e.g., an absolute pressure of 500 mm. in region 32, an absolute pressure of 20 mm. in region 30 and a pressure of 100 mm. in area 28.

FIGURE 5 illustrates the formation of a beaker 34 of polytetrafluoroethylene using a porous sand mold 36. The beaker is formed in the manner described in connection with FIGURES 1 and 2 by application of a vacuum to the mold having a slurry of 3% Teflon in varnish makers and painters naphtha followed by sintering at 400° C.

FIGURE 6 illustrates an alternative form of the invention where externally applied pressure is used rather than a vacuum to cause the flow of the liquid through the porous mandrel or mold on which the polytetrafluoroethylene is to be deposited.

Preferably, the pressure differential, when using the positive pressure procedure, should be above 10 p.s.i., e.g., it can be 15 p.s.i., 30 p.s.i., 100 p.s.i., or even higher. Thus, pressure differentials of 200 p.s.i. or more can be employed. If the particle size distribution of the Teflon is narrow and the particles are close to spherical in shape, a relatively high pressure can be used. With elongated particles and a wider size range, lower pressures are normally employed.

For best results the porous support employed in either the vacuum or pressure has the following characteristics:

(1) It should have rigidity and dimensional stability (with the aid of the supporting perforated plate, if one is employed) under the conditions of filtration and sintering.

(2) It should have a sufficiently smooth surface to provide a satisfactory finish to the Teflon part when it is desired to have a smooth finish on the part.

(3) It should have sufficient porosity to permit good drainage of the suspending liquid and avoid undue pressure drop in the flow thereof through it.

(4) The pores should be sufficiently small that the Teflon itself does not enter them. A suitable example of a satisfactory mold is 120 to 150 mesh (U.S. Standard sieve) Ottawa sand bonded with 5% of a shell-type phenol-formaldehyde resin.

Referring more specifically to FIGURE 6 there is provided a steel housing 40 which contains a perforated, conically-shaped metal (e.g., stainless steel) plate 42 in which fits snugly, porous mandrel 44. The mandrel is made of salt but can be made of any of the other porous materials previously set forth.

The housing 40, cone 42 and mandrel 44 are enclosed under a pressure cover 46 secured by ring flange 48 to form a pressure-type housing around the porous mandrel. A dispersion of 3% micropulverized polytetrafluoroethylene in kerosene is pumped into the housing through nozzle 50 and distributed over the surface of the porous mandrel 44 by distributor rig 52. The slurry deposits on the inside surface 54 of the mandrel and forms a layer of solvent-wet polytetrafluoroethylene 56. The interior of the housing chamber is pressurized by air admitted through inlet 58. In place of air there can be used other pressurizing fluids, e.g., gases such as nitrogen, argon, helium, carbon dioxide, carbon monoxide and nitrous oxide. After the desired amount of polytetrafluoroethylene has been deposited on the mandrel 44 and the polytetrafluoroethylene layer 56 has built up to the desired thickness, the carrier liquid is permitted to drain through outlet 60 for a few minutes longer. The liquid is drained to an atmospheric separator pot, although it is also possible to drain it to a vacuum system.

The pressure in the chamber, as indicated supra, is normally above 10 p.s.i. Preferably, it is at least 30 p.s.i.

In a specific example using the apparatus of FIGURE 6 with a salt mandrel ¾ inch thick and employing a 3% slurry of pulverized polytetrafluoroethylene in kerosene and employing a differential pressure of 15 p.s.i., there was formed a conical, fairly uniform, bubble-free preform. The mandrel 44 containing the preform was placed in a polypropylene bag and placed in a hydroclave. Water was pumped into the hydroclave to impart a pressure of 1500 p.s.i. to densify the polytetrafluoroethylene nose cone. The densified cone was removed from the hydroclave and sintered at 390° C. to give the final nose cone having a density of about 2.2.

When using a differential pressure of 8 p.s.i. in the pressure deposition step the preform was not as uniform and some bubbles were noted. It was observed that by using higher pressures, e.g., 15 p.s.i. or above, in the deposition there was a higher flow rate so that the polytetrafluoroethylene suspension did not experience undue size segregation by settling during deposition. Furthermore, entrapped air bubbles were less of a problem when using the higher filtering pressures.

In another experiment using the apparatus of FIGURE 6 initial deposition from a 6.6% Teflon slurry in kerosene was carried out at 15 p.s.i. This was followed by application of 100 p.s.i. air pressure to the deposited layer. In this case, 3% additional suspending liquid was expelled. After hydroclaving at 1500 p.s.i. and sintering at 390° C. a much more uniform piece was obtained than when omitting the step of applying 100 p.s.i. air pressure.

FIGURE 7 illustrates the match molding technique wherein there is provided a female mold 70 of 190 to 220 mesh Ottawa sand bonded by a 5% of a penol-formaldehyde resin to form a microporous structure. The mold is placed in a vacuum chamber 72 and was supported by rings 74. There are also provided vacuum lines 76, 78 and 80. Additionally, there is provided a male mold 82 which can be conveniently secured to the cover 84. Teflon slurry, e.g., a 4% slurry in varnish makers and painters naphtha, is introduced in the space between the male mold 82 and female mold 70 and the vacuum applied. Slurry can be added continuously or intermittently until the space between the molds after draining the liquid by the vacuum, e.g., of 5 mm. is entirely filled with polytetrafluoroethylene 86.

The male mold can have the same shape or a different shape depending on the configuration desired for the finished object. The article formed in the mold of FIGURE 7 can be hydroclaved, or press formed, e.g., at 3000 p.s.i. and then sintered, e.g., at 360° C. to form the finished product which is then removed from the mold.

The process of the present invention is suitable for use with either a male or female mold or for molding articles between a male and female mold. All kinds of polytetrafluoroethylene products can be made, e.g., expansion joints, pipe fittings, nose cones, gaskets, breakers and other laboratory ware.

While the invention is primarily useful in the molding of polytetrafluoroethylene, it is suitable for molding other fluorinated polymers, such as a copolymer of tetrafluoroethylene with 5–50% of hexafluoropropene, vinyl fluoride or vinylidene fluoride (e.g., 80% tetrafluoroethylene, 20% hexafluoropropene copolymer) or polyvinyl fluoride, polyhexafluoropropene, polymonochlorotrifluoroethylene, copolymer of 70–30% vinylidene fluoride and 30–70% hexafluoropropene (e.g., 50% vinylidene fluoride-50% hexafluoropropene copolymer). There can be employed other perfluorocarbon polymers, such as those disclosed in Bro et al. Patent No. 2,946,763, Mallouk et al. Patent No. 2,955,099, Bro et al. Patent No. 2,988,542, Coffman Patent No. 3,047,553 and Schreyer Patent No. 3,085,083. Illustrative of such polymers are tetrafluoroethylene-hexafluoropropylene copolymers having weight ratios of 75:25 or 30:70 or 34:66, or 19:90 or 1:2 or 4:3 or 23.8:30 or 85:15 and a copolymer of hexafluoropropylene and vinylidene fluoride (7.5:3.2).

The invention is particularly valuable, as indicated, in molding non-planar shaped articles and articles having substantial thickness.

To prevent excess material forming in the lower portion of the mold, e.g., using the mold and liquid loading shown in FIGURES 1 and 2 sufficiently higher vacuum can be employed in the upper areas of the mold to compensate for the shorter time of contact with the slurry of Teflon. The degree of vacuum can be varied either by deliberately applying a higher vacuum in the desired areas which will contact the slurry for the shortest period of time or by constructing the mold of a varied degree of porosity, the mold being most porous in those areas which the slurry will contact for the shortest period of time. Thus, in making a beaker 34 of uniform thickness, there can be employed a mold 36 in which the porosity is gradually decreased from the top to the bottom of the mold while a constant degree of vacuum is maintained during the shaping operation.

A uniform thickness of the shaped article can also be maintained by continuously replenishing the supply of Teflon slurry during the vacuum molding step and pouring the excess slurry out of the mold after shutting off the vacuum.

It will be appreciated that the height of the slurry in the mold can be maintained constant during the vacuum treatment and articles having different thickness in different portions can be obtained by varying the degree of vacuum or varying the porosity of the mold in the manner previously indicated.

While it is preferable to retain the molded piece in the porous mold during sintering, this is not essential, but, instead, the piece can be removed from the slurry-forming mold and placed on some other type of support during sintering. Thus, the piece could be removed from the mold and placed on a flat piece of metal or upon another support, e.g., a solid male mold.

In forming the object, e.g., a cone, in the porous mold it is frequently advantageous to rotate the mold during the pouring of the Teflon slurry on the surface to insure a uniform product. Alternatively, the Teflon slurry can be applied to the mold by a rotating spray and allowing the liquid to drain through between the time that any given point on the mold receives successive spray treatments.

In the pressure molding procedure build up in different areas can be regulated in the same manner as in the vacuum molding procedure, e.g., by varying the degree of porosity of the mold or by tilting the mold.

In referring to superatmospheric pressures the pressures are normally gauge pressure. Thus, a superatmospheric pressure of 1 atmosphere is a gauge pressure of 14.7 p.s.i. (i.e., 2 atmospheres absolute pressure).

What is claimed is:

1. A process of molding a shaped article from a polymeric halohydrocarbon member of the group consisting of polytetrafluoroethylene, polymonochlorotrifluoroethylene, polyvinyl fluoride, polyvinylidene fluoride, polyhexafluoropropene, copolymers of tetrafluoroethylene with a member of the group consisting of hexafluoropropene, vinyl fluoride and vinylidene fluoride and a copolymer of hexafluoropropene with vinyl fluoride and vinylidene fluoride and a copolymer of hexafluoropropene with vinyl fluoride comprising placing in a porous mold a slurry of the polymeric halohydrocarbon in a liquid dispersant inert to and capable of wetting the polymeric halohydrocarbon and vaporizable at a temperature below the fusion point of the polymeric halohydrocarbon, applying a pressure differential between one side of the mold and the other to conform the polymeric halohydrocarbon to the mold, placing the mold containing the conformed halohydrocarbon in a hydroclave, applying a pressure of at least 1,000 p.s.i. in the hydroclave to compact the polymeric halohydrocarbon and thereafter heating the mold containing the compacted polymeric halohydrocarbon to the fusion point of the polymer and removing the polymeric halohydrocarbon from the mold.

2. The process of claim 1 wherein said pressure differential is obtained by applying a superatmospheric pressure to the slurry.

3. A process as claimed in claim 1 wherein said pressure differential is obtained by applying a vacuum to the side of the mold opposite said polymeric halohydrocarbon slurry.

References Cited by the Examiner

UNITED STATES PATENTS

| 1,336,180 | 4/1920 | Allen et al. | 264—87 |
| 1,898,561 | 2/1933 | Miller | 264—86 |
| 2,997,448 | 8/1961 | Hochberg | 264—49 XR |
| 3,015,855 | 1/1962 | Merkel | 264—127 |

FOREIGN PATENTS 216,064  7/1958  Australia.

ROBERT F. WHITE, *Primary Examiner.*

J. A. FINLAYSON, *Assistant Examiner.*